United States Patent

Hashimoto et al.

Patent Number: 6,034,343
Date of Patent: Mar. 7, 2000

[54] HYBRID WELDING APPARATUS

[75] Inventors: Yoshio Hashimoto; Takashi Ishide, both of Takasago, Japan

[73] Assignee: Mitsubishi Heavy Industries, Ltd., Tokyo, Japan

[21] Appl. No.: 09/148,494

[22] Filed: Sep. 4, 1998

[30] Foreign Application Priority Data

Nov. 25, 1997 [JP] Japan .................................. 9-322860

[51] Int. Cl.⁷ ................................................. B23K 9/173
[52] U.S. Cl. ................. 219/74; 219/121.63; 219/121.64; 219/137 R
[58] Field of Search .................... 219/74, 121.63, 219/121.64, 136, 137 R

[56] References Cited

U.S. PATENT DOCUMENTS 4,167,662  9/1979  Steen .................................. 219/121.64
4,507,540  3/1985  Hamasaki .................................. 219/74

OTHER PUBLICATIONS

Reprints of the National Meeting of Japan Welding Society, No. 61, 339, Autumn 1997, Sep. 28, 29, and 30, 1997— Takashi Ishide and Yoshio Hashimoto, YAG Laser Welding with Filler Wire Coaxial to the Optical Axis, pp. 342–343, Sep. 10, 1997.

Reprints of the National Meeting of Japan Welding Society, No. 61, 340, Autumn 1997, Sep. 28, 29, and 30, 1997— Takashi Ishide, Yoshio Hashimoto, Takashi Akaba, and Tadashi Nagashima, TIG–YAG Laser Welding Coaxial to the Optical Axis, pp. 344–345, Sep. 10, 1997.

Primary Examiner—Clifford C. Shaw

[57] ABSTRACT

A hybrid welding apparatus for subjecting a base metal to gas-shielded arc welding and laser welding comprises a laser generator for emitting a laser beam and a condenser optical system for condensing the laser beam to laser weld the base metal. The condenser optical system includes a plurality of lenses, each having a hole portion in the center thereof. A tubular supply holder for supplying a welding wire is passed through these respective hole portions of the lenses and located substantially coaxially with the axis of the condenser optical system. The laser beam and welding wire to be applied to the base metal are arranged coaxially, so that laser-welding and arc-shielded welding can be simultaneously performed with a wide angle between the welding head and a bevel of the base metal, thereby deepening penetration of the weld at an increased welding speed.

12 Claims, 1 Drawing Sheet

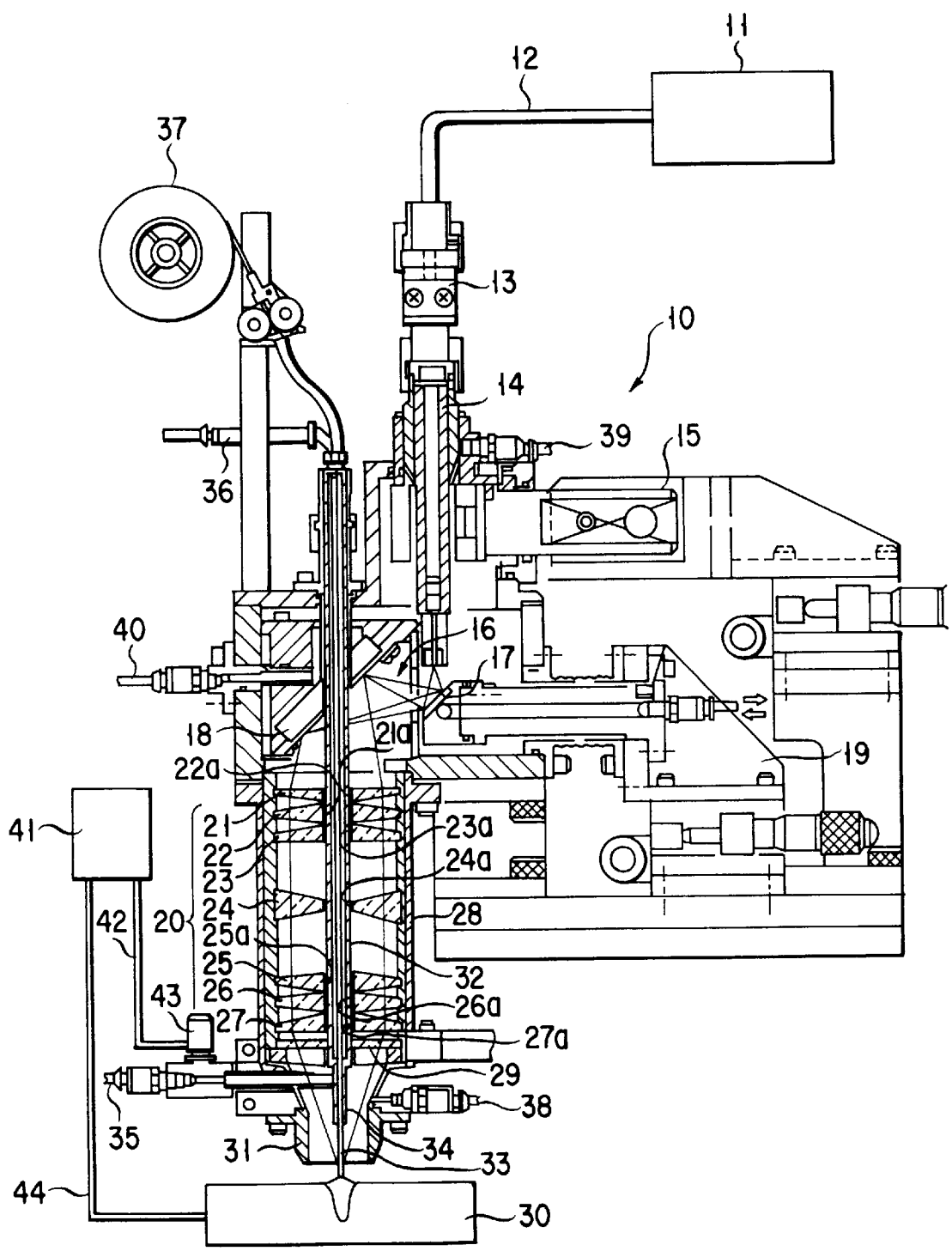
FIGURE

HYBRID WELDING APPARATUS

BACKGROUND OF THE INVENTION

The present invention relates to a hybrid welding apparatus combining arc welding and laser welding, and more specifically, to a hybrid welding apparatus designed so that a tolerance for the angle of a welding head to a bevel of a base metal is wide, energy can be concentrated within a narrower range to deepen the penetration of the base metal, the welding speed is high, and the welding head is small-sized.

Laser welding and gas-shielded arc welding are examples of welding techniques for bonding solid-state metals. In laser welding, laser beam is converged at one point on a welding base metal by means of an optical system composed of lenses and the like. This method is suited for the welding of refractory materials. A dedicated laser welding head is used for the laser welding.

On in other hand, the gas-shielded arc welding, an electric arc is generated between a base metal and a wirelike consumable metal electrode that is fed automatically from a bobbin, and a gas, such as carbonic acid gas, flows out from around the arc to shield weld zones. A dedicated arc welding head is used for the gas-shielded arc welding.

According to the aforesaid laser welding, however, the laser beam is condensed by means of the optical system or lenses, so that an allowance for the angle of the laser beam to the bevel is narrow. Accordingly, the accuracy of the beam angle to the bevel must be maintained exactly. According to the gas-shielded arc welding, moreover, the arc becomes unstable if the welding speed is increased. For stable gas-shielded arc welding, therefore, the feeding speed for the consumable metal electrode is restricted to about 2 m/min.

Hybrid welding, which combines the laser welding and the gas-shielded arc welding, has been employed in an attempt to cover up the drawbacks of the two conventional welding methods.

In hybrid welding, an arc from an electrode and a laser beam are aligned so that their heat energy can be used to weld a weld zone of a base metal. Specifically, a laser welding head and a gas-shielded arc welding head must be inclined at their respective angles to the base metal lest they interfere with each other, in order to align a spot of the laser beam from the laser welding head and a spot of the arc from the arc welding head with the weld zone of the base metal.

Since the heads are inclined with respect to the base metal in this case, however, heat energy losses prevent weld penetration at the base metal from being deep enough.

Since the welding heads are large-sized, there are restrictions on the type of the object which can be welded, as well as the weld zones. The results in unsatisfactory working efficiency. Further, the large-sized welding heads are awkward to handle.

BRIEF SUMMARY OF THE INVENTION

The object of the present invention is to provide a compact hybrid welding apparatus capable of high-speed welding, in which a tolerance for the angle of a welding head to a bevel of a base metal can be widened.

In order to achieve the above object, a hybrid welding apparatus according to the present invention comprises a laser generator for emitting a laser beam, a condenser optical system including lenses each having a hole portion in the center such that the laser beam from the laser generator is condensed by the lenses to subject a base metal to laser welding, a supply holder passed through the respective hole portions of the lenses, whereby a welding wire is supplied substantially coaxially with the axis of the lenses, and an arc welding power source for supplying current to the welding wire and the base metal, thereby subjecting the same portion of the base metal that is subjected to the laser welding with the laser beam to gas-shielded arc welding.

According to the invention, the optical axis of the laser beam and the welding wire are arranged coaxially with each other, so that allowances for the angles of the optical axis and the wire to a bevel of the base metal are wide enough to ensure satisfactory working efficiency. Since the laser beam and arc from the welding wire can be concentrated accurately, moreover, heat energy can be concentrated to deepen the penetration of the base metal and increase the welding speed. Furthermore, a welding head of the welding apparatus can be reduced in size.

According to another feature of the invention, a tubular guide holder for wire current supply is located coaxially with the optical path of the laser beam. The welding wire is passed through the guide holder. Defined in the guide holder is a coolant passage, in which a coolant, e.g., water, is circulated to cool the holder. The guide holder, which is heated during welding operation, can be prevented from overheating by being cooled with the circulated coolant in this manner.

Since the guide holder is located coaxially with the optical path of the laser beam, moreover, it is heated also with the laser beam applied thereto. Since it is cooled with the coolant, however, the guide holder never overheats. It is unnecessary, therefore, to provide a mechanism for screening the holder from the laser beam or to form a complicated optical path such that the laser beam is split lest it be applied to the holder. Thus, the construction of the welding apparatus can be simplified, and an incident spot of the laser beam can be formed accurately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE is a vertical sectional view showing part of a hybrid welding apparatus according to the present invention.

DETAILED DESCRIPTION OF THE INVENTION

An embodiment of the present invention will now be described with reference to the accompanying drawing.

A hybrid welding apparatus according to the present embodiment comprises a composite welding head 10 and a laser generator 11. The generator 11 is connected with one end of an optical fiber 12, the other end of which is connected to an optical fiber connector 13. Thus, a laser beam emitted from the generator 11 can be guided to the connector 13. The laser beam transmitted through the connector 13 passes through a guide member 14 for guiding the laser beam.

The guide member 14 is connected to an optical fiber drive system 15, which can adjust the focal distance of the laser beam when activated.

The laser beam introduced into the guide member 14 is guided into a reflector mounting portion 16 through the lower end of the member 14. A pair of reflectors 17 and 18 are arranged in the mounting portion 16. The reflector 17, which has a smaller diameter, is located opposite the lower end portion of the guide member 14.

The reflector 17 is connected with a reflector drive system 19, which can adjust the angle of reflection. The optical axis of the laser beam that advances in an optical system (mentioned later) can be regulated by suitably adjusting the angle.

The laser beam reflected by the reflector 17 is directed to the reflector 18, which has a larger diameter. The laser beam incident on the reflector 18 is reflected so that its optical axis is in line with that of a condenser optical system 20.

The condenser optical system 20 is composed of lenses 21, 22, 23, 24, 25, 26 and 27, which are set in a tube 28. A glass protector 29 is attached to the lower end side of the tube 28, whereby the condenser optical system 20 in the tube 28 is protected against adhesion of fumes and sputters that are produced during welding operation.

Provided under the glass protector 29 is a nozzle 31 for use as an outlet through which the laser beam is converged on a base metal 30 and radiated.

Hole portions 21a to 27a of a suitable size are formed in the respective central portions of the reflector 18 and the lenses 21 to 27. These hole portions 21a to 27a are penetrated by a wire current supply guide holder 32 for use as a supply holder for a welding wire 33 that is coated with gold. The holder 32 is located so that its central axis is in line with the optical axis of the laser beam.

The lower end side of the wire current supply guide holder 32 forms a distal tip 34 having a small diameter such that the welding wire 33, an electrode, can be forced out through the tip 34. The holder 32 is in the form of a hollow tube that can receive the wire 33 therein. The interior of the holder 32 is defined as a passage through which the wire 33 is passed and also as a coolant passage through which cooling water is circulated. Thus, the guide holder 32 can be protected against heat that is generated during the welding operation.

In order to supply the cooling water to the coolant passage, the distal tip 34 under the tube 28 is provided with a cooling water inlet portion 35. The cooling water introduced through the inlet portion 35 rises in the wire current supply guide holder 32, and is discharged into a cooling water outlet portion 36 at the upper end of the holder 32.

A welding wire feeder 37 is disposed above the reflector mounting portion 16. The feeder 37 is provided with a bobbin that is wound with the welding wire 33. The wire 33 can be fed at a given speed into the wire current supply guide holder 32 by rotating the bobbin.

The nozzle 31 is provided with auxiliary shield gas supply device 38 for supplying an auxiliary shield gas. Thus, if the auxiliary shield gas is supplied from the supply device 38 after the welding wire 33 is fed, weld zones can be shielded as they are welded.

Corresponding to the supply of the auxiliary shield gas, assist gas supply means 39 is connected to the interior of the guide member 14. The supply device 39 serves to introduce the cooling gas into the guide member 14, thereby cooling the optical fiber connector 13 and the reflector 17. The introduced cooling gas is mixed with the auxiliary shield gas to shield the weld zones of the base metal 30 during the welding operation.

Further, the reflector mounting portion 16 is fitted with cooling gas supply device 40, whereby a cooling gas is introduced into the mounting portion 16 to cool the reflector 18, lenses 21 to 27, glass protector 29, and wire current supply guide holder 32.

An arc welding power source 41 for supplying anode-side power to the welding wire 33 is provided outside the tube 28. The power source 41 is connected with one end of a cable 42, the other end of which is connected to a feeder connector 43 that is attached to the cooling water inlet portion 35.

Since the cooling water inlet portion 35 is connected to the distal tip 34, electric power from the arc welding power source 41 is supplied to the welding wire 33 through the tip 34.

The arc welding power source 41 is connected to the base metal 30 by means of a cable 44 so that cathode-side power can be applied to the base metal 30.

The following is a description of the operation of the hybrid welding apparatus having the construction described above.

In welding the base metal 30, laser generator 11 is actuated to output the laser beam, and the optical fiber drive system 15 and the reflector drive system 19 are driven to adjust or align the focus and optical axis of the laser beam. After this adjustment is finished, the laser generator 11 is actuated to radiate the laser beam.

At the same time, the welding wire feeder 37 is actuated to feed the welding wire 33 into the wire current supply guide holder 32, while the arc welding power source 41 is actuated to supply anode- and cathode-side powers to the wire 33 and the base metal 30, respectively.

Then, the auxiliary shield gas supply means 38 is actuated to supply the auxiliary shield gas through the nozzle 31, whereupon the base metal 30 is subjected to laser welding and gas-shielded arc welding at the same time. In order to protect the individual units against heat generated during the welding operation, the cooling water is introduced into the wire current supply guide holder 32 through the cooling water inlet portion 35, the cooling gas is introduced into the guide member 14 through the assist gas supply device 39, and the cooling gas is introduced from the cooling gas supply device 40. Thus, welding of the base metal 30 is advanced.

Constructed in this manner, the composite welding head 10 can be used to effect hybrid welding that combines laser welding and gas-shielded arc welding. This hybrid welding can be carried out at a higher speed than the conventional gas-shielded arc welding. Although the conventional welding speed is limited to 2 m/min, for example, the hybrid welding can enjoy a higher speed of 2 to 3 m/min.

Further, tolerances for the angles of the welding wire and the laser beam to a bevel during the welding operation can be widened to the levels for the regular arc welding, so that the welding work is easy and secure.

Since the condenser optical system 20 and the wire current supply guide holder 32 are arranged coaxially and integrally, moreover, compaction of the composite welding head 10 can be achieved.

Since the wire current supply guide holder 32, which is concentric with the optical axis of the condenser optical system 20, is located in the optical path of the laser beam, it can be heated also with the laser beam. Accordingly, the holder 32 is heated with both heat from the weld zones and the laser beam, so that its temperature may possibly rise to too high a level. According to the present embodiment, in particular, the holder 32 is located penetrating the reflector 18 in order to reduce the size of the welding head 10. In the region corresponding to the reflector 18, therefore, the laser beam is applied at right angles to the guide holder 32, so that the holder 32 is overheated in this region.

According to the present embodiment, however, the wire current supply guide holder 32 is cooled with the coolant, e.g., cooling water, circulating therein, so that it can be prevented from being damaged by overheating.

Thus, the apparatus according to the present embodiment can enjoy a simple construction without requiring use of a screening mechanism for screening the guide holder 32 from the laser beam or means for splitting the laser beam lest the beam be incident on the holder 32.

It is to be understood that the present invention is not limited to the embodiment described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A hybrid welding apparatus, comprising:
   a laser generator for emitting a laser beam;
   a condenser optical system including lenses each having a hole portion in the center such that the laser beam from the laser generator is condensed by the lenses to subject a base metal to laser welding;
   a supply holder passed through the respective hole portions of said lenses, whereby a welding wire is supplied substantially coaxially with the axis of said lenses, said supply holder including a tube through which said welding wire is passed and a coolant passage for circulating coolant therein; and
   an arc welding power source for supplying current to said welding wire and said base metal, thereby subjecting the same portion of the base metal that is subjected to laser welding with gas-shielded arc welding;
   wherein said condenser optical system is overlain by a reflector for deflecting said laser beam in the direction of the axis of said condenser optical system, said supply holder penetrating said reflector.

2. A hybrid welding apparatus, comprising:
   a laser for emitting a laser beam;
   a plurality of lenses, each having a hole at a center thereof for condensing said laser beam to laser weld a base metal;
   a tube passed through said holes which is concentric with the axis of said plurality of lenses, whereby a welding wire is supplied therethrough coaxially with said axis of said plurality of lenses, said tube including a coolant passage for circulating coolant therein; and
   an arc welding power source for supplying current to said welding wire and said base metal, thereby subjecting the same portion of said base metal that is laser welded with gas-shielded arc welding.

3. The welding apparatus of claim 2, further including first and second reflectors, said first reflector overlaying said plurality of lenses for deflecting said laser beam in the direction of the axis of said plurality of lenses, said tube bisecting said first reflector.

4. The welding apparatus of claim 3, said second reflector connected to a reflector drive system for adjusting the angle of reflection for said laser beam which is incident thereon, said incident laser beam being reflected to said first reflector.

5. The welding apparatus of claim 2, said tube including a coolant passage for circulating coolant therethrough.

6. A hybrid welding apparatus, comprising:
   a laser for emitting a laser beam;
   a plurality of lenses, each having a hole at a center thereof for condensing said laser beam to laser weld a base metal;
   a supply holder passed through said holes which is concentric with the axis of said plurality of lenses, whereby a welding wire is supplied therethrough coaxially with said axis of said plurality of lenses, said supply holder including a coolant passage for circulating coolant therein;
   a first reflector overlaying said plurality of lenses and bisected by said supply holder for deflecting said laser beam in the direction of the axis of said plurality of lenses; and
   an arc welding power source for supplying current to said welding wire and said base metal, thereby subjecting the same portion of said base metal that is laser welded with gas-shielded arc welding.

7. The welding apparatus of claim 6, further including a second reflector connected to a reflector drive system for adjusting the angle of reflection for said laser beam which is incident thereon, said incident laser beam being reflected to said first reflector.

8. The welding apparatus of claim 6, said supply holder including a tube through which said welding wire is passed, and including a coolant passage for circulating coolant therethrough.

9. A hybrid welding apparatus, comprising:
   a laser generator for emitting a laser beam;
   a plurality of lenses, each having a hole at a center thereof for condensing said laser beam to laser weld a base metal, said plurality of lenses cooled by a second cooling source;
   a supply holder passed through said holes and concentric with the axis of said plurality of lenses, whereby a welding wire is supplied therethrough coaxially with said axis of said plurality of lenses, said supply holder cooled by at least two separate cooling sources; and
   an arc welding power source for supplying current to said welding wire and said base metal, thereby subjecting the same portion of said base metal that is laser welded with gas-shielded arc welding.

10. The welding apparatus of claim 9, further including first and second reflectors, said first reflector overlaying said plurality of lenses for deflecting said laser beam in the direction of the axis of said plurality of lenses, said supply holder bisecting said first reflector.

11. The welding apparatus of claim 10, said second reflector cooled by one of said at least two separate cooling sources and connected to a reflector drive system for adjusting the angle of reflection for said laser beam which is incident thereon, said incident laser beam being reflected to said first reflector.

12. A method of hybrid welding a base metal, comprising:

emitting a laser beam;

condensing said laser beam through a plurality of lenses each having a hole therethrough which defines a channel to subject the base metal to laser welding;

cooling said channel with at least two separate cooling sources;

inserting a welding wire through said channel so that said welding wire is coaxial with the axis of said plurality of lenses; and supplying current to said welding wire and the base metal so that the same portion of said base metal is arc-welded simultaneously with said laser welding.

* * * * *